United States Patent [19]
Nishide et al.

[11] Patent Number: 5,274,455
[45] Date of Patent: Dec. 28, 1993

[54] TELEVISION RECEIVER HAVING A MICROCOMPUTER FOR DETERMINING THE PRESENCE OF ADDRESSABLE FUNCTIONAL CIRCUIT BOARDS

[75] Inventors: Takuya Nishide, Taki; Shigeru Sakaguchi, Takatsuki, both of Japan

[73] Assignee: Matsushita Electric Industrial Co., Ltd., Osaka, Japan

[21] Appl. No.: 887,490

[22] Filed: May 26, 1992

[30] Foreign Application Priority Data

May 31, 1991 [JP] Japan .................. 03-128128

[51] Int. Cl.$^5$ ........................... H04N 5/44
[52] U.S. Cl. ...................... 358/188; 358/903
[58] Field of Search ............ 358/188, 160, 903; 361/407, 412, 413

[56] References Cited

U.S. PATENT DOCUMENTS

| | | | |
|---|---|---|---|
| 4,161,728 | 7/1979 | Insam | 358/903 |
| 4,337,480 | 6/1982 | Bourassin et al. | 358/188 |
| 4,649,428 | 3/1987 | Jones et al. | 358/188 |

OTHER PUBLICATIONS

Danbury et al., "Small Area Networks...", Electronic Engineering, vol. 56, No. 685, Jan. 1984, pp. 41–46.

*Primary Examiner*—James J. Groody
*Assistant Examiner*—John W. Miller
*Attorney, Agent, or Firm*—Stevens, Davis, Miller & Mosher

[57] ABSTRACT

A television receiver in which addresses are assigned to functional boards provided with different functional circuits such as teletext demodulators and satellite broadcast wave receivers, to identify each functional circuit, address data for specifying a functional circuit is sent out from a microcomputer, and a response signal from the functional circuit is read out by the microcomputer to judge the presence or absence of the functional board having the specified functional circuit, thereby automatically determining whether the functional board is to be controlled.

1 Claim, 4 Drawing Sheets

31 ⋯ PRINTED WIRING BOARD

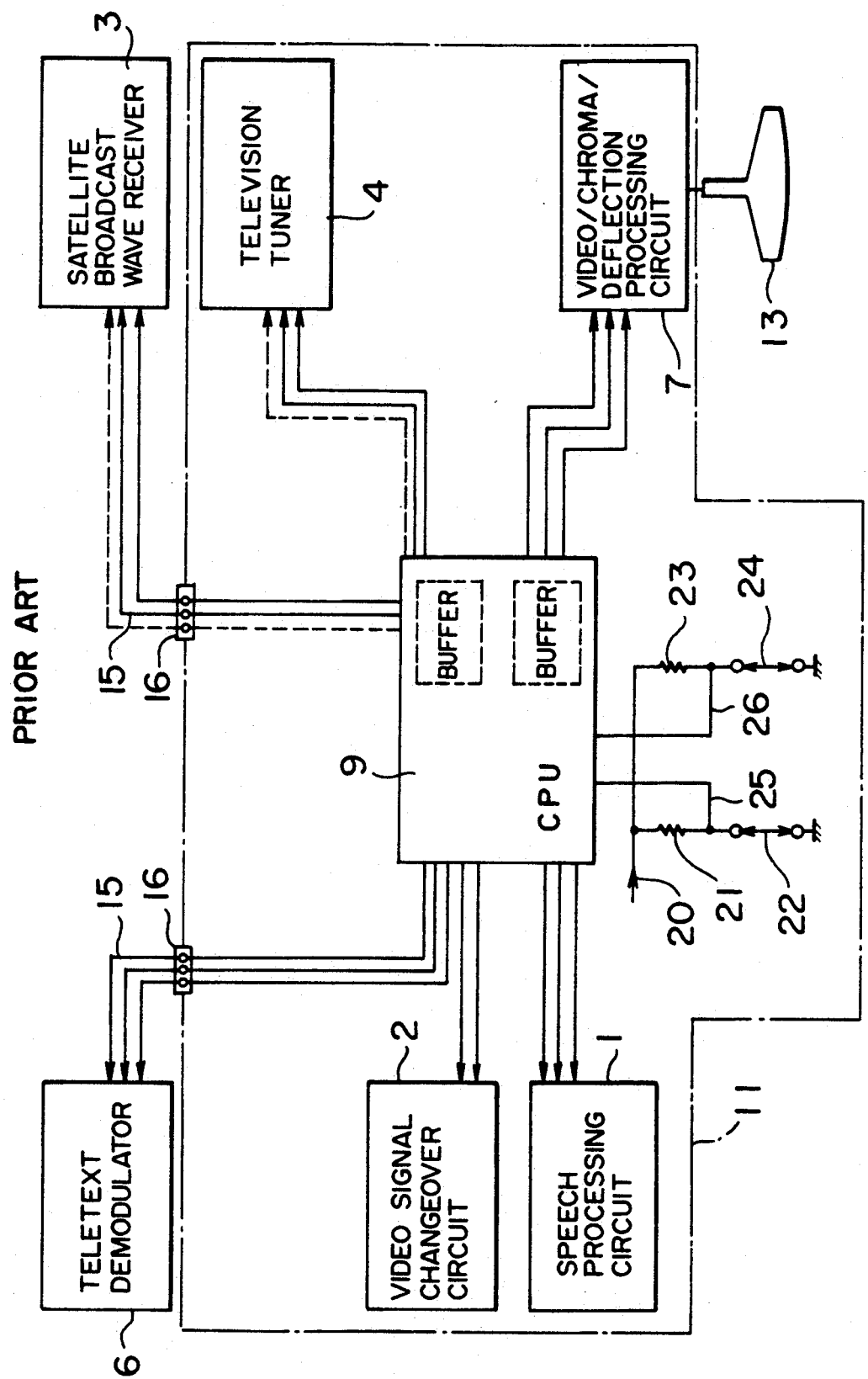

TELEVISION RECEIVER HAVING A MICROCOMPUTER FOR DETERMINING THE PRESENCE OF ADDRESSABLE FUNCTIONAL CIRCUIT BOARDS

BACKGROUND OF THE INVENTION

The present invention relates to a television receiver which is provided with functional boards having different functions such as the functions of television tuners for different color television systems, the function of a teletext demodulator (namely, demodulator for teletext), and the function of a satellite broadcast wave receiver (namely, demodulator for received satellite broadcast wave).

In order to satisfy various needs of users, it is necessary for a conventional television receiver to have a structure applicable to many kinds of receivers. For example, the conventional television receiver is required to have a structure applicable for a television receiver having a built-in satellite broadcast wave receiver, a television receiver having a built-in teletext receiver, a television receiver having both a built-in satellite broadcast wave receiver and a built-in teletext receiver, and television receivers for different color television systems such as NTSC, PAL and SECAM.

In order to satisfy the above requirement, a television receiver uses a fundamental model applicable for many kinds of television receivers, and has a structure shown in FIG. 3. In FIG. 3, reference numeral 1 designates a speech processing circuit, 2 a video signal changeover circuit, 3 a satellite broadcast were receiver, 4 a television tuner, 5 a VIF circuit, 6 a teletext demodulator, 7 a video/chroma/deflection processing circuit, 8 an FBT (fly back transformer), and 9 a microcomputer. The speech processing circuit 1, the video signal changeover circuit 2, the television tuner 4, the VIF circuit 5, the video/chroma/deflection processing circuit 7, the FBT 8, the microcomputer 9, and a power circuit are mounted on a printed wiring board 11 of a television receiver, to be connected to one another. Further, these circuits and parts are connected to a CRT 13 mounted on an outer cabinet 12, to perform the fundamental operation of the television receiver. Additionally, the satellite broadcast wave receiver and the teletext demodulator 6 are fixed to side faces of speakers 14a and 14b mounted on the outer cabinet 12, respectively, and are connected to the printed wiring board 11 through lead wires 15 and connectors 16.

When such a television receiver is produced, it is necessary for the microcomputer 9 to check whether or not each of the satellite broadcast wave receiver 3 and the teletext demodulator 6 has been attached to the television receiver. A method of judging whether each of the parts 3 and 6 is present or not, will be explained below, with reference to the block diagram shown in FIG. 4.

Referring to FIG. 4, control signals stored previously in the memory of the microcomputer 9 are sent to circuit blocks, to control the circuit blocks, thereby causing the television receiver to function. In order to check whether or not each of the teletext demodulator 6 and the satellite broadcast wave receiver 3 is included in the television receiver, a series combination of a resistor 21 and a jumper wire 22 and a series combination of a resistor 23 and a jumper wire 24 are both connected between a power source 20 and a ground, and an electric potential at the connecting point between the resistor 21 or 23 and the jumper wire 22 or 24 is detected by the microcomputer 9. In more detail, in a case where the jumper wire 22 is absent, a lead wire 25 connected to the resistor 21 has the potential of the power source 20, and it is judged by the microcomputer 9 that the teletext demodulator 6 is incorporated in the television receiver. Hence, the microcomputer 9 controls the function of the teletext demodulator 6. In contrast to the above, in a case where the jumper wire 22 is present, the lead wire 25 connected to the resistor 21 has a ground potential, and it is judged by the microcomputer 9 that the teletext demodulator 6 is not incorporated in the television receiver. Hence, the microcomputer 9 controls the function of the television receiver devoid of the teletext demodulator 6.

Similarly, the presence and absence of the satellite broadcast wave receiver 3 correspond to the absence and presence of the jumper wire 24, respectively, and it is judged on the basis of the potential of a lead wire 26 connected to the resistor 23 whether or not the satellite broadcast wave receiver 3 is included in the television receiver. In order to fabricate four kinds of television receivers board upon the above combinations, it is required that four kinds of printed wiring boards based upon the presence of absence of each of two jumper wires are produced and managed in a factory. Further, the teletext demodulator 6 and the satellite broadcast wave receiver 3 are selectively attached to the television receivers in accordance with four kinds of printed wiring boards. Then, the functions of the teletext demodulator 6 and the satellite broadcast wave receiver 3 are checked, and the television receivers thus obtained are managed.

SUMMARY OF THE INVENTION

As mentioned above, when a television receiver having a structure applicable for four kinds of television receivers based upon the presence or absence of each of the teletext demodulator 6 and the satellite broadcast wave receiver 3 is fabricated, a potential change due to the presence or absence of each of the jumper wires 22 and 24 corresponding to the absence or presence of each of these functional circuits 6 and 3, is supplied to the microcomputer 9 through the lead wire 25 or 26, to judge whether or not each of the teletext demodulator 6 and the satellite broadcast wave receiver 3 is incorporated in the television receiver, and the microcomputer 9 controls the functions of these functional circuits 6 and 3. In order to fabricate four kinds of television receivers based upon the above combinations, it is required that four kinds of printed wiring boards 11 based upon the presence or absence of each of two jumper wires are produced and managed in a factory. Further, it is required that the teletext demodulator 6 and the satellite broadcast wave receiver 3 are selectively attached to television receivers in accordance with four kinds of printed boards 11, the functions of the attached functional circuits 6 and 3 are checked, and the television receivers thus obtained are managed. Furthermore, in a case where a different function is added to a television receiver, there arises a problem that the kinds of printed wiring board is increased, that is, six or eight kinds of printed wiring boards have to be produced.

The present invention has been made to solve the above problem, and it is an object of the present invention to provide a television receiver, in which the presence or absence of each of functional boards having different functions such as the function of a teletext demodulator and the function of a satellite broadcast wave receiver, is judged, and it is automatically determined whether each functional board is to be controlled or not.

In order to attain the above object, according to the present invention, there is provided a television receiver which comprises: specified one selected from functional boards provided with different kinds of functional circuits, each of the functional circuits having one of functions including the function of a teletext demodulator and the function of a satellite broadcast wave receiver, addresses being assigned to the functional boards to specify each functional circuit; a printed wiring board for mounting the functional boards thereon, the printed wiring board being provided with wiring means to be connected with each functional circuit; and a microcomputer connected through a serial bus to each functional board, for judging whether or not each functional board is mounted on the printed wiring board, address data indicative of a functional circuit being sent out from the microcomputer, a response signal from the functional circuit being read out by the microcomputer, to judge the presence or absence of the functional board having the functional circuit, thereby automatically determining whether the functional board is to be controlled or not.

A television receiver according to the present invention has the above-mentioned construction. Accordingly, each functional board has a functional circuit given a specified address. When address data indicative of the specified address of a functional circuit is sent from the microcomputer to the functional board having the functional circuit, a response signal from the functional circuit is read out by the microcomputer, to judge the presence or absence of the functional board, thereby automatically determining whether the functional board is to be controlled or not. That is, according to the present invention, many kinds of television receivers can be automatically produced.

BRIEF DESCRIPTION OF THE DRAWINGS

FIG. 4 is a block diagram showing the conventional television receiver of FIG. 3.

DESCRIPTION OF THE PREFERRED EMBODIMENT

An embodiment of the present invention will be explained below, with reference to the drawings.

Figure 1:
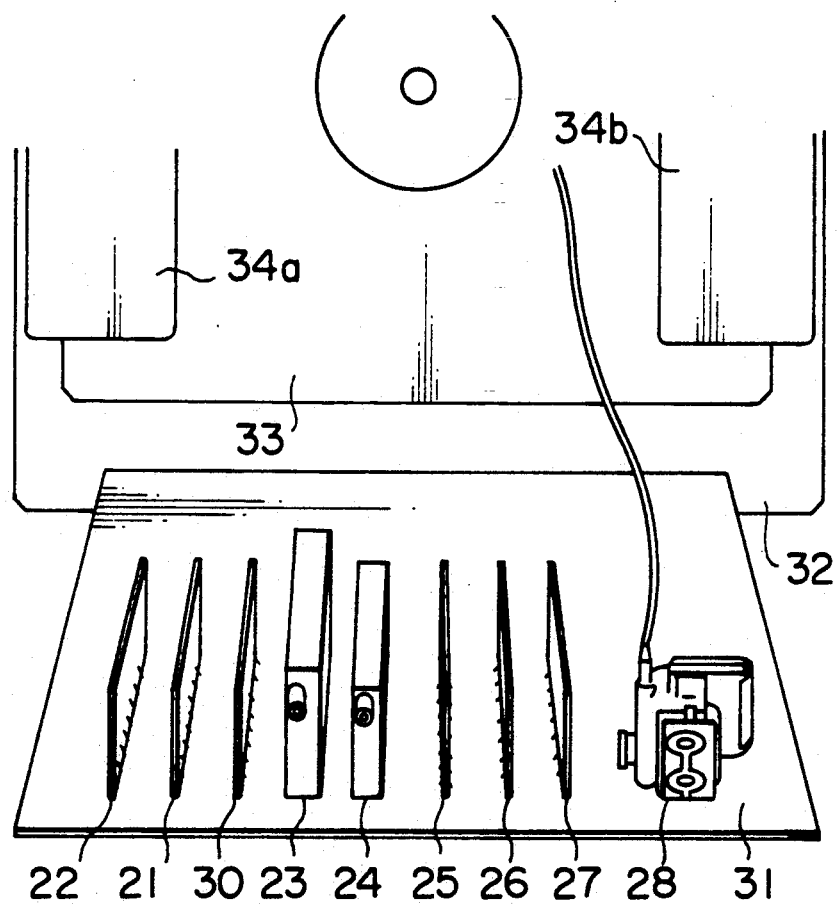
FIG. 1 is an explained, perspective view which shows a television receiver according to an embodiment of the present invention, viewed from the back of the television receiver.
Figure 2:
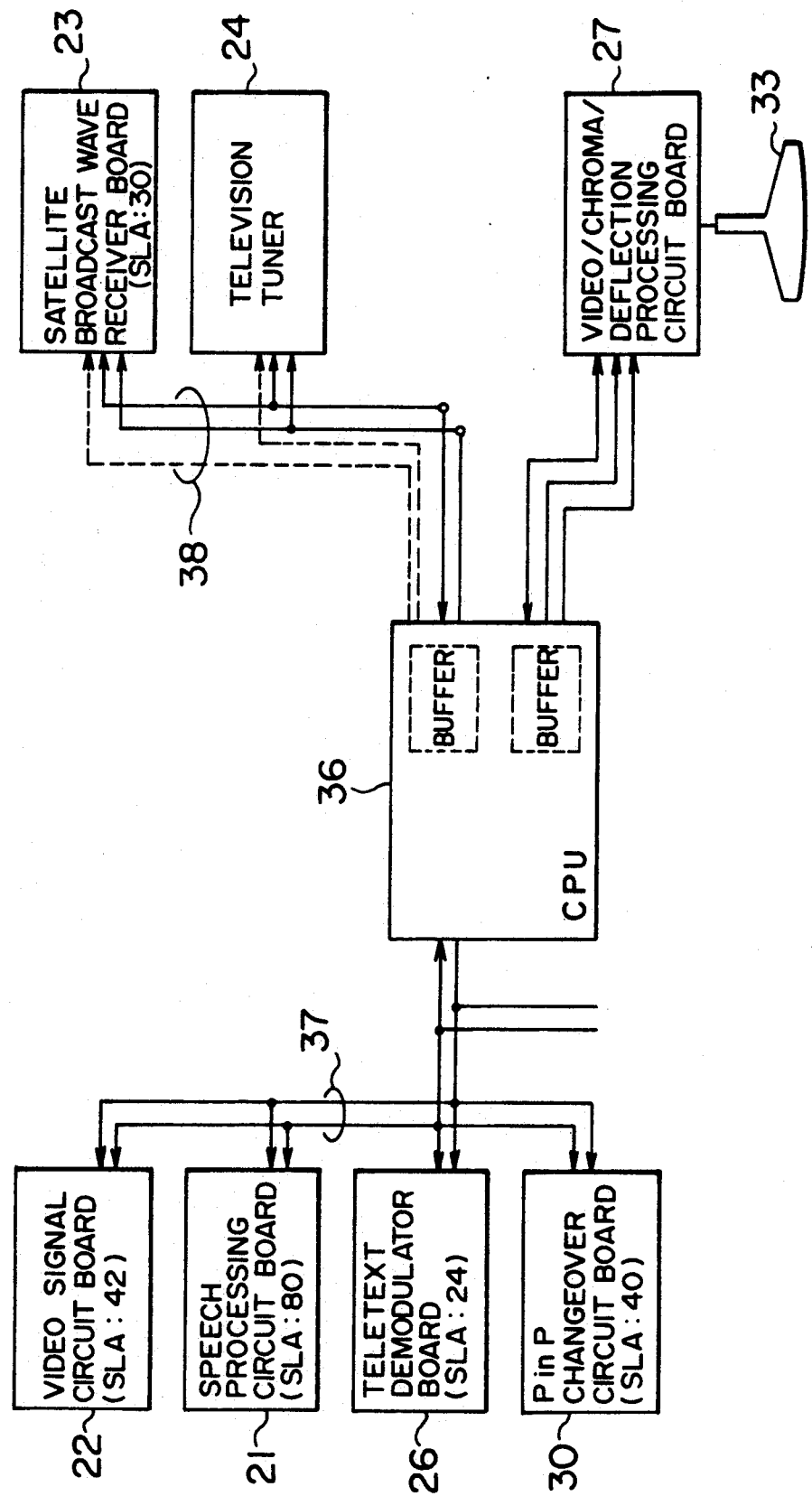
FIG. 2 is a block diagram showing the television receiver of FIG. 1.
Figure 3:
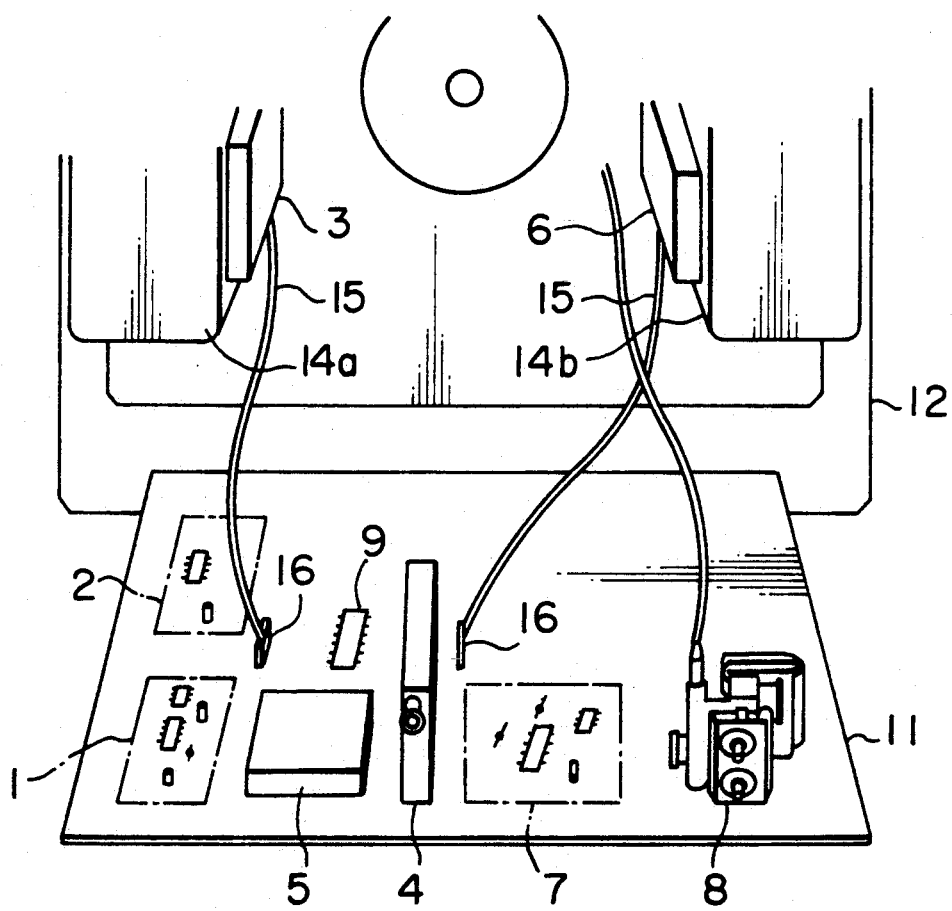
FIG. 3 is an explained, perspective view which shows a conventional television receiver, viewed from the back thereof.

FIG. 1 is an explained, perspective view which shows a television receiver according to an embodiment of the present invention, viewed from the back of the television receiver, and FIG. 2 is a block diagram showing the above television receiver.

In order to use a substrate chassis applicable to many kinds of television receivers, a television receiver according to the present invention has the structure shown in FIG. 1. In FIG. 1, reference numeral 21 designates a speech processing circuit board (namely, a functional board provided with a speech processing circuit), 22 a video signal changeover circuit board, 23 a satellite broadcast wave receiver board, 24 a television tuner, 25 a VIF-circuit/microcomputer board, 26 a teletext demodulator board, 27 a video/chrome/deflection processing circuit board, 28 an FBT, and 30 a picture-in-picture (P in P) changeover circuit board. These boards and other parts are mounted on a printed wiring board 31 to be connected with each other, and are further connected to a CRT 33 mounted on an outer cabinet 32, to operate the television receiver.

Next, a method, by which a microcomputer 36 judges whether or not the teletext demodulator board 26, the satellite broadcast wave receiver board 23 and others are mounted on the printed wiring board, will be explained, with reference to the block diagram of FIG. 2. Referring to FIG. 2, a microcomputer 36 on the VIF-circuit/microcomputer board 25 is connected to functional boards which include the speech processing circuit board 21, the video signal changeover circuit board 22, the satellite broadcast wave receiver board 23, the teletext demodulator board 26 and the picture-in-picture changeover circuit board 30, through serial buses 37 and 38 each formed of a data line and a clock line. Addresses (that is, slave addresses SLA) for specifying each of functional circuits on these functional boards are assigned to the functional boards. When address data indicative of one of the above addresses is sent from the microcomputer 36 to a corresponding functional board, the functional circuit on the functional board delivers a response signal, and the microcomputer 36 reads out the response signal to judge the presence or absence of the functional board, thereby automatically determining whether the functional board is to be controlled or not.

In more detail, in a case where the teletext demodulator board 26 is mounted on the printed wiring board 31, address data indicative of the address-24 which is the slave address of a teletext demodulator, is sent from the microcomputer 36 to the teletext demodulator board 26 through the serial bus 37, and a response signal indicative of the reception of the address data is sent from the teletext modulator board 26 to the microcomputer 36 through the serial bus 37. As a result, the microcomputer 36 judges the printed wiring board 31 to be the printed wiring board of a television receiver including a teletext demodulator therein, and operates software for controlling the function of the teletext demodulator board 26. In contrast to the above, in a case where the teletext demodulator board 26 is not mounted on the printed wiring board 31, when the address data indicative of the address-24 which is the slave address of the teletext demodulator, is sent out from the microcomputer 36 through the serial bus 37, the response signal indicative of the reception of the address data does not appear on the serial bus 37, because of the absence of the teletext demodulator board 26. Thus, the microcomputer judges the printed wiring board 11 to be the printed wiring board of a television receiver which is devoid of a teletext demodulator, and operates software for controlling the television receiver.

Similarly, the presence of absence of each of the satellite broadcast wave receiver board 23, the picture-in-picture changeover circuit board 30 and the speech processing circuit board 21 can be readily detected. Accordingly, many kinds of television receiver board upon the presence of absence of each of the functional boards can be automatically produced.

As has been explained in the foregoing, according to the prior art, the following method is used for judging whether or not a teletext demodulator and/or a satellite broadcast wave receiver has been incorporated in a television receiver. That is, these functional circuit blocks are selectively attached to the printed board, and then a voltage dependent upon one of two resistors mounted on a printed wiring board and the present or absence of a jumper wire mounted on the printed wiring board and connected to the resistor, is detected by a microcomputer. Accordingly, many kinds of printed wiring boards have to be produced and managed. While, according to the present invention, a microcomputer automatically judges whether or not a functional board having the function of a teletext demodulator and/or a functional board having the function of a satellite broadcast wave receiver, is mounted on a printed wiring board, and thus it is automatically determined whether each of these functional boards is to be controlled or not. Accordingly, many kinds of television receivers can be automatically produced, and moreover are low in manufacturing cost.

We claim:

1. A television receiver comprising:
   a printed wiring board;
   a serial bus;
   at least one selected functional board mounted on said printed wiring board and connected to said bus, said at least one selected functional board being selected from a group of optional functional boards, each said optional functional board comprising one of a teletext demodulator circuit, a speech processing circuit, a video signal circuit, a satellite broadcast wave receiver circuit, and a picture-in-picture changeover circuit, each said optional functional board having an inherent address and comprising means for outputting a response signal when its address is carried on said bus and when it is mounted on said printed wiring board; and
   a microcomputer, connected to said bus for (i) judging whether each of said optional functional boards is mounted on said printed wiring board, (ii) outputting an address of each of said optional functional boards onto said serial bus, (iii) receiving said response signal so as to judge a presence or absence of each of said optional functional boards on said printed wiring board, whereby a determination is made by said microcomputer whether each of said functional boards is to be controlled.

* * * * *